United States Patent
Dhonukshe et al.

(10) Patent No.: US 12,193,438 B2
(45) Date of Patent: Jan. 14, 2025

(54) PARTIALLY ENCAPSULATED PLANT CUTTINGS

(71) Applicant: Dümmen Group B.V., De Lier (NL)

(72) Inventors: Pankaj Bacharam Dhonukshe, Renkum (NL); Tobias Günter Dummen, Rheinberg (DE); Johannes Franciscus Johanna Maria van den Heuvel, Rotterdam (NL)

(73) Assignee: Dümmen Group B.V., De Lier (NL)

( * ) Notice: Subject to any disclaimer, the term of this patent is extended or adjusted under 35 U.S.C. 154(b) by 88 days.

(21) Appl. No.: 15/577,125

(22) PCT Filed: May 25, 2016

(86) PCT No.: PCT/EP2016/061762
§ 371 (c)(1),
(2) Date: Nov. 27, 2017

(87) PCT Pub. No.: WO2016/189021
PCT Pub. Date: Dec. 1, 2016

(65) Prior Publication Data
US 2019/0021312 A1    Jan. 24, 2019

(30) Foreign Application Priority Data
May 28, 2015 (NL) .................................. 2014879

(51) Int. Cl.
| | |
|---|---|
| *A01N 25/10* | (2006.01) |
| *A01G 2/10* | (2018.01) |
| *A01G 2/30* | (2018.01) |
| *A01G 2/35* | (2018.01) |
| *A01N 3/00* | (2006.01) |
| *A01N 25/00* | (2006.01) |
| *A01N 25/02* | (2006.01) |
| *A01N 25/24* | (2006.01) |
| *A01N 47/40* | (2006.01) |

(52) U.S. Cl.
CPC ............... *A01N 25/10* (2013.01); *A01G 2/10* (2018.02); *A01G 2/30* (2018.02); *A01G 2/35* (2018.02); *A01N 3/00* (2013.01); *A01N 25/00* (2013.01); *A01N 25/02* (2013.01); *A01N 25/24* (2013.01); *A01N 47/40* (2013.01)

(58) Field of Classification Search
USPC .......................................................... 504/100
See application file for complete search history.

(56) References Cited

U.S. PATENT DOCUMENTS

| | | | |
|---|---|---|---|
| 5,143,536 A  * | 9/1992 | Runkis ................... | A01N 25/04 504/284 |
| 2004/0203151 A1* | 10/2004 | Sharon ................... | A01H 4/005 435/430 |
| 2007/0163173 A1* | 7/2007 | Savich ................... | A01G 24/00 47/58.1 R |
| 2008/0216404 A1 | 9/2008 | Jarvis | |
| 2014/0075604 A1 | 3/2014 | Volterrani et al. | |
| 2015/0150162 A1* | 5/2015 | Carver ..................... | A01H 3/00 800/298 |

FOREIGN PATENT DOCUMENTS

| | | | | | |
|---|---|---|---|---|---|
| CN | 1810956 A | * | 8/2006 | | |
| CN | 103875527 A | * | 6/2014 | | |
| GB | 2425530 A | * | 11/2006 | ............. | A01G 24/00 |
| WO | 2011125045 A2 | | 10/2011 | | |

OTHER PUBLICATIONS

Singh et al, Acta Physiol Plant (2009) 31:649-653.*
Skoog ,Physiol Plant 15:473-497, 1962.*
Naik et al., "Nutrient-alginate encapsulation of in vitro nodal segments of pomegranate (*Punica granatum* L.) for germplasm distribution and exchange", Scientia Horticulturae, 2006, vol. 108, pp. 247-252.

* cited by examiner

*Primary Examiner* — Gina C Justice
(74) *Attorney, Agent, or Firm* — The Webb Law Firm (57) ABSTRACT

Provided herein are methods for providing improved vigor, and especially priming or improving root formation, of plant cuttings and to plant cuttings obtained thereby. Specifically, the methods include the steps of a) contacting a plant cutting with a polymeric solution, or suspension, optionally including one or more plant growth promoting and/or plant protecting compounds, thereby providing a coated plant cutting; b) allowing the polymeric solution, or suspension, of the coated plant cutting to solidify into a complexed coating, thereby providing an encapsulated plant cutting. The encapsulated plant cutting is coated with the complexed coating from the basal cut surface or tip of the plant cutting to less than 60% of the total length of said plant cutting to partially encapsulate the plant cutting with the complexed coating.

13 Claims, 10 Drawing Sheets

PARTIALLY ENCAPSULATED PLANT CUTTINGS

CROSS-REFERENCE TO RELATED APPLICATIONS

This application is the United States national phase of International Application No. PCT/EP2016/061762 filed May 25, 2016, and claims priority to Dutch Patent Application No. 2014879 filed May 28, 2015, the disclosures of which are hereby incorporated in their entirety by reference.

BACKGROUND OF THE INVENTION

The present invention relates to methods for providing improved vigour, and especially faster root development and/or improving adventitious root formation, of plant cuttings and to plant cuttings, amongst others, obtainable by the present methods.

Plant cutting, also known as striking or cloning, is a technique for vegetatively or asexually propagating plants in which a part of the stem or root of the parent plant generally ranging from 1 to 3 cm to 25 cm, is placed in a suitable growth substrate such as moist soil, potting mix, coir or rock wool. The cutting produces new roots, stems, or both, and thus becomes a new plant independent of the parent. Typically, striking is a simple process in which a small amount of the parent plant is removed. The removed part, called the cutting, is then induced to grow as an independent plant.

Since most plant cuttings will initially have no roots these roots need to be developed, which is a critical component for survival of the cutting. Some roots, called adventitious roots, arise mainly from an organ other than the root usually a stem and in some cases a leaf. They are especially numerous on underground stems. The formation of adventitious roots makes it possible to vegetatively propagate many plants from stem or leaf cuttings. These cuttings do not have a primary root (emerging from an embryo's radicle), but the adventitious roots give rise to branch or lateral roots.

Plant cuttings also generally require a moist growth substrate, which, however, cannot be too wet to prevent rotting of the plant cutting. A number of growth substrates are generally used in this process, including but not limited to, soil, perlite, vermiculite, coir, rock wool and expanded clay pellets. The environment should be humid and partial shade is preferably provided to prevent the plant cutting from drying out. After plant cuttings are placed in a suitable growth substrate, they can be watered thoroughly such as with a fine mist. After initial watering, the growth medium can be allowed to almost dry out before subsequent watering with the aim to keep the soil moist but not wet and waterlogged.

If initiation of root development for the plant cutting is difficult to achieve, a rooting hormone to promote plant growth can be administered. Though not essential, several compounds may be used to promote the formation of roots through the signalling activity of plant hormone auxins. Among the commonly used chemicals is an auxin precursor indole-3-butyric acid (IBA) used as a powder, liquid solution or gel. This compound is applied either to the basal cut surface or tip of the plant cutting or as a foliar spray.

SUMMARY OF THE INVENTION

Although plant cutting is a relatively simple technique for asexually propagating plants at a small scale, at a commercial scale however, a major problem is to ensure the general quality of a plant cutting and more specifically to ensure that a plant cutting is actually capable of developing into a mature plant in a timely manner a condition generally designated in the art as vigour. One cause of this problem is that plants cuttings are generally produced at a nursery or farm in one location and subsequently transported to another location where they are allowed to develop into mature plants.

It is an object of the present invention, amongst other objects, to obviate at least partially the above problems associated with the production of plant cuttings at a commercial scale.

This object of the present invention, amongst other objects, is met by providing methods and plant cuttings as outlined in the appended claims.

Specifically, this object of the present invention, amongst other objects, is, according a first aspect, met by a method for improving the vigour of plant cuttings, wherein the method comprises the steps of:
  a) contacting a plant cutting with a polymeric solution, or suspension, optionally comprising one or more plant growth promoting and/or plant protecting compounds, thereby providing a coated plant cutting;
  b) allowing the polymeric solution, or suspension, of the coated plant cutting to solidify into a complexed coating thereby providing an encapsulated plant cutting;
wherein said encapsulated plant cutting is coated with the complexed coating from basal cut surface or tip of the plant cutting to less than 60% of the total length of said plant cutting to partially encapsulate the plant cutting with the complexed coating.

DETAILED DESCRIPTION

The present inventors have surprisingly discovered that partially coating a plant cutting with a polymeric coat optionally comprising one or more plant growth promoting and/or plant protecting compounds significantly improves the vigour of the plant cutting especially when the plant cutting is produced at, for example, a nursery and subsequently transported over relatively large distances before being cultivated into a mature plant elsewhere. Further, the present inventors have surprisingly discovered that the present partially encapsulated plant cutting requires no, or a relatively small growth substrate volume in order to remain viable thereby significantly reducing transport costs. Further, the present inventors have surprisingly discovered that the present partially encapsulated plant cutting produces roots quicker thereby significantly reducing greenhouse growing costs.

According to the present invention, it is essential that the plant cutting is only partially encapsulated to avoid the development of necrotic patches negatively influencing the vigour of the plant cutting.

According to a preferred embodiment of this first aspect of the present invention, the present polymeric solution, or suspension, is selected from the group consisting of sodium alginate, agar, polyacrylamide, agarose, gelatin, and biodegradable plastics.

Sodium alginate, also designated as alginic acid or algin, is an anionic polysaccharide found in the cell walls of brown algae, where, through binding with water, it forms a viscous gum. In extracted form, sodium alginate absorbs water quickly and is capable of absorbing 200 to 300 times water of its own weight. The general structure of sodium alginate is a linear copolymer with homopolymeric blocks of (1-4)-linked β-D-mannuronate (M) and its C-5 epimer α-L-guluronate (G) residues covalently linked in different sequences or blocks. The constituting monomers can appear in homopolymeric blocks of consecutive G-residues (G-blocks), consecutive M-residues (M-blocks) or alternating M and G-residues (MG-blocks).

Agar is a jelly-like substance obtained from algae. Agar is derived from the polysaccharide agarose, which forms the supporting structure in the cell walls of certain species of algae. Agar is the resulting mixture of the linear polysaccharide agarose and a heterogeneous mixture of smaller molecules called agaropectin. Chemically agar can be designated as a polymer composed of subunits of galactose.

Acrylamide is a chemical compound with the chemical formula $C_3H_5NO$. It is a white odorless crystalline solid, soluble in water, ethanol, ether, and chloroform. Acrylamide can be prepared by the hydrolysis of acrylonitrile by nitrile hydratase. In industry, most acrylamide is used to synthesize polyacrylamides, which find many uses as water-soluble thickeners. These include use in wastewater treatment, gel electrophoresis (SDS-PAGE), papermaking, ore processing, tertiaryoil recovery.

Agarose is a linear polymer with a molecular weight of about 120,000, consisting of alternating D-galactose and 3,6-anhydro-L-galactopyranose linked by α-(1→3) and β-(1→4) glycosidic bonds. The 3,6-anhydro-L-galactopyranose is an L-galactose with an anhydro bridge between the 3 and 6 positions, although some L-galactose unit in the polymer may not contain the bridge. Some D-galactose and L-galactose units can be methylated. Each agarose chain contains approximately 800 molecules of galactose, and the agarose polymer chains form helical fibers that aggregate into a supercoiled structure. When solidified, the fibers form a three-dimensional mesh of channels with a diameter depending on the concentration of agarose used.

Gelatin is a mixture of peptides and proteins produced by partial hydrolysis of collagen extracted from the skin, bones, and connective tissues of animals. During hydrolysis, the natural molecular bonds between individual collagen strands are broken down into a form that rearranges more easily. Its chemical composition is, in many respects, closely similar to that of collagen.

According to an especially preferred embodiment of this first aspect of the present invention, the present polymeric solution or suspension is sodium alginate. The present plant cuttings can be readily provided with a sodium alginate coat by contacting, for example by dipping, the basal cut surface of plant cutting with a sodium alginate solution of, for example, 1 to 10% w/v. Sodium alginate is especially preferred considering its non-toxic nature and biocompatibility characteristics. Further, a sodium alginate coat can be readily complexed by contacting the coated plant cutting with a $Ca^{2+}$ comprising solution, such as a 0.5 to 5% w/v solution of $CaCl_2$ for a sufficient amount of time, for example 10 minutes to 1 hour, to allow an exchange of the sodium ions by calcium ions.

According to another preferred embodiment of this first aspect of the present invention, the present method further comprises, after complexing, a wash or rinsing step, for example using water, to remove leftover potential toxic residual compounds such as ions.

According to the present invention, the present one or more plant growth promoting and/or plant protecting compounds are selected from the group consisting of auxin and derivatives thereof, plant hormones, antibiotics, sugars, minerals and trace elements.

A particularly suitable plant growth promoting and/or plant protecting compound is auxin or a derivative thereof such as 1-naphthaleneacetetic acid or 2,4-dichlorophenoxyacetic acid.

1-Naphthaleneacetic acid or NAA is an organic compound with the formula $C_{10}H_7CH_2CO_2H$. The colorless solid is soluble in organic solvents. NAA is a synthetic plant hormone of the auxin family and is an ingredient in many commercial plant rooting horticultural products; it is a rooting agent and used for the vegetative propagation of plants from stem and leaf cutting. It is also used for plant tissue culture. The hormone NAA does not occur naturally, and, like all auxins, is toxic to plants at high concentrations.

2,4-Dichlorophenoxyacetic acid, also designated as 2,4-D, hedonal or trinoxol is a common systemic herbicide used in the control of broadleaf weeds. It is one of the most widely used herbicides in the world. 2,4-D is a synthetic auxin and as such it is often used in laboratories for plant research and as a supplement in plant cell culture media such as MS medium.

According to a most preferred embodiment of this first aspect of the present invention, the present plant cuttings are encapsulated with a complexed coating from basal cut surface or tip of the plant cutting to less than 50% of the total length of said plant cutting, preferably less than 40%, more preferably less than 20%, most preferably less than 10% to minimize, amongst others, the development of necrotic patches negatively influencing the vigour of the present plant cuttings.

For example, the general length a plant cutting is between 1 cm to 25 cm thus within the context of the present invention, a plant cutting encapsulated with a complexed coating from basal cut surface or tip of the plant cutting to less than 50% indicates that less than 0.5 cm to 12.5 cm of the plant cutting is encapsulated with the present complexed coating measured from the tip of the plant cutting where the plant cutting is separated from the parent plant. As another example, a plant cutting encapsulated with a complexed coating from basal cut surface or tip of the plant cutting to less than 10% indicates that less than 0.1 cm to 2.5 cm of the plant cutting is encapsulated with the present complexed coating measured from the tip where the plant cutting is separated from the parent plant.

According to the present invention, the vigour of the present plant cutting is especially improved with respect to faster root development and/or improving adventitious root formation of said plant cuttings. Although some of the one or more plant growth promoting and/or plant protecting compounds according to the invention have been implicated in root development, present within the present complexed polymeric coat, these compound still provide a surprising beneficial development of "true roots", i.e. adventitious root formation as opposed to the development of callus and immature, non-functional or partially functional roots. Inherently, the formation, or the induction, of a functional root system, i.e. a root system allowing to support the development of a plant cutting into a mature plant, strongly contributes to the vigour of the present plant cuttings.

According to a second aspect, the present invention relates to encapsulated plant cutting comprising from the basal cut surface or tip of the plant cutting to less than 60% of the total length of said plant cutting a complexed coating comprising a solidified polymeric solution, or suspension, optionally comprising one or more plant growth promoting and/or plant protecting compounds. These encapsulated plant cuttings can suitably be produced using the methods as outlined above.

According to a preferred embodiment of this second aspect of the present invention, the present polymeric solution, or suspension, is selected from the group consisting of sodium alginate, agar, polyacrylamide, agarose, biodegradable polymers and gelatin.

According to an especially preferred embodiment of this second aspect of the present invention, the present polymeric solution, or suspension, is sodium alginate. The present plant cuttings can be readily provided with a sodium alginate coat by contacting, for example by dipping the basal cut surface of plant cutting into a sodium alginate solution of, for example, 1 to 10% w/v. Sodium alginate is especially preferred considering its non-toxic nature and biocompatibility characteristics. Further, the sodium alginate coat can be readily complexed by contacting the coated plant cutting with a $Ca^{2+}$ comprising solution, such as a 0.5 to 5% w/v solution of $CaCl_2$ for a sufficient amount of time, for example 10 minutes to 1 hour, to allow an exchange of the sodium ions by calcium ions.

According to the present invention, the present one or more plant growth promoting and/or plant protecting compounds are selected from the group consisting of auxin and derivatives thereof, plant hormones, antibiotics, sugars, minerals and trace elements.

A particularly suitable and influential plant growth promoting and/or plant protecting compound is auxin or a derivative thereof such as 1-naphthaleneacetetic acid or 2,4-dichlorophenoxyacetetic acid.

According to a most preferred embodiment of this second aspect of the present invention, the present plant cuttings are encapsulated with a complexed coating from the basal cut surface or tip of the plant cutting to less than 50% of the total length of said plant cutting, preferably less than 40%, more preferably less than 20%, most preferably less than 10% to, for example, minimize the development necrotic patches negatively influencing the vigour of the present plant cuttings.

According to a third aspect, the present invention relates to encapsulated plant cuttings as outlined above in a growth substrate, preferably a growth substrate selected from the group consisting of vermiculite, glass wool, peat, rock wool, soil, coir and clay.

The present invention will be further detailed in the following example of especially preferred embodiments of the present invention. In the example, reference is made to figures wherein:

Example

Figure 1:
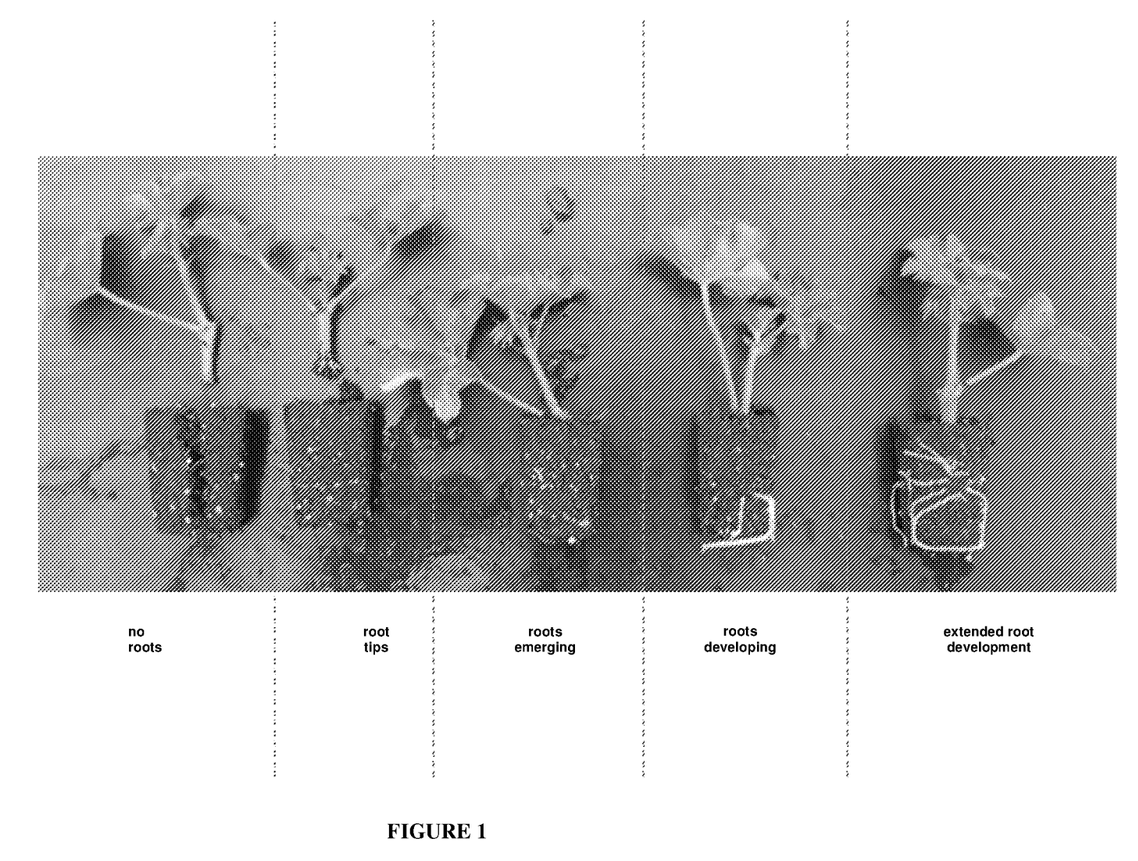
FIG. 1: provides exemplary photographs of different type of root development used to assess the vigour of the present plant cuttings.

Three two parts [1) coating of fresh cuttings and 2) coating of callused cuttings] trials were performed for assessing plant cutting vigour and especially root formation (FIG. 1) by following the experimental protocol as depicted in a below scheme (URC denotes plant cutting):

Part 1 (Coating of Fresh Cuttings)

Step 1 (day 0) URC cut, stored at 6° C. and shipped by plane;
Step 2 (day 2) URC arrive facility and stored at 6° C.;
Step 3 (day 3) URC coated with alginate and auxin formulations and put in vermiculite;
Step 4 (day 12) root analysis (1) and URC with callus and roots taken out from vermiculite and stored at 6° C.;
Step 5 (day 14) URC put in Targa strips;
Step 6 (day 23) root analysis (2) in Targa.

Part 2 (Coating of Callused Cuttings)

Step 1 (day 0) URC cut, stored at 6° C. and shipped by plane;
Step 2 (day 2) URC arrive facility and stored at 6° C.;
Step 3 (day 3) uncoated URC put in vermiculite;
Step 4 (day 12) callused URC taken out from vermiculite, coated with alginate and auxin formulations and stored at 6° C.;
Step 5 (day 14) URC put in Targa strips;
Step 6 (day 23) root analysis (2) in Targa.

Plant cuttings from two species were used, i.e. *Pelargonium peltatum* (20629) and *P. zonale* (20261 and 20309). For the trials, fresh plant cuttings were divided into 4 groups:

Group 1: non-encapsulated control group;
Group 2: encapsulated plant cuttings with no plant growth promoting and/or plant protecting compounds in the complexed coat;
Group 3: encapsulated plant cuttings with NAA (10 mg/l) in the complexed coat;
Group 4: encapsulated plant cuttings with 2,4-D (10 mg/l) in the complexed coat.

Encapsulation was performed by dipping, cutting face first, the plant cutting (part 1, as mentioned in scheme above) and the callused cuttings (part 2, as mentioned in scheme above) in a 2.5% w/v sodium alginate solution thereby coating over approximately 10% of the length of the plant cutting with sodium alginate. Subsequently, the coated plant cuttings were incubated in a $CaCl_2$ bath (1.1% w/v) for 25 to 30 minutes allowing the exchange of the sodium ions in the alginate by calcium ions for providing a complexed alginate coat. Then, the encapsulated plant cuttings were rinsed in water to remove residual calcium and sodium ions.

All four groups of plant cuttings and callused cuttings were stored at 6° C. For part1 of the trials, the plant cuttings were placed in vermiculite and callus and root initiation were assayed by visually analyzing individual cuttings and categorizing them based on four successive stages of callus and root initiation: callus, mature callus, roots emerging, roots grown. These cuttings from part 1 of the trials and the callused cuttings from part 2 of the trials were subsequently shifted to soil present in the targa strips and vigour was assayed by visually analyzing individual cuttings and categorizing them based on stages of root formation.

Root formation was divided in five categories:
No roots
Root tips
Roots emerging
Roots developing
Extended root development A representative example of the above categories is presented in FIG. 1.

Figure 2:
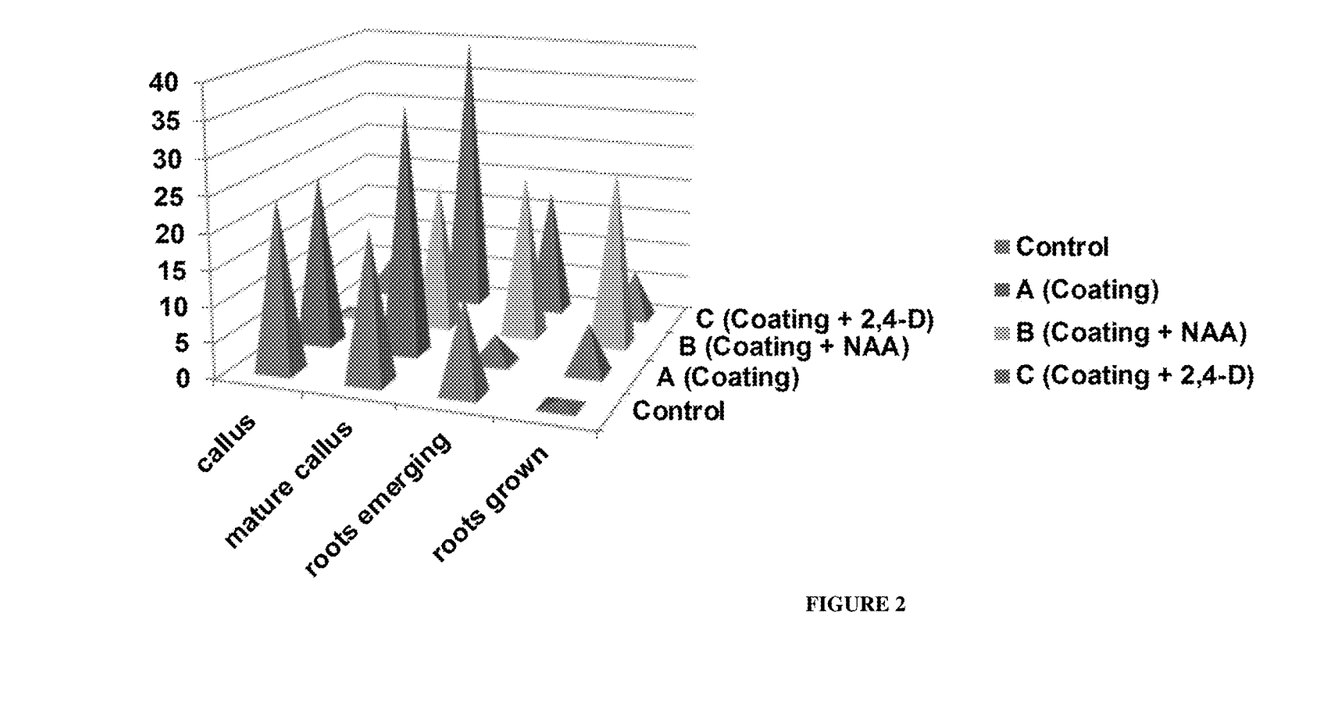
FIG. 2: shows a graphical representation of the data shown in Table 1.
Figure 3:
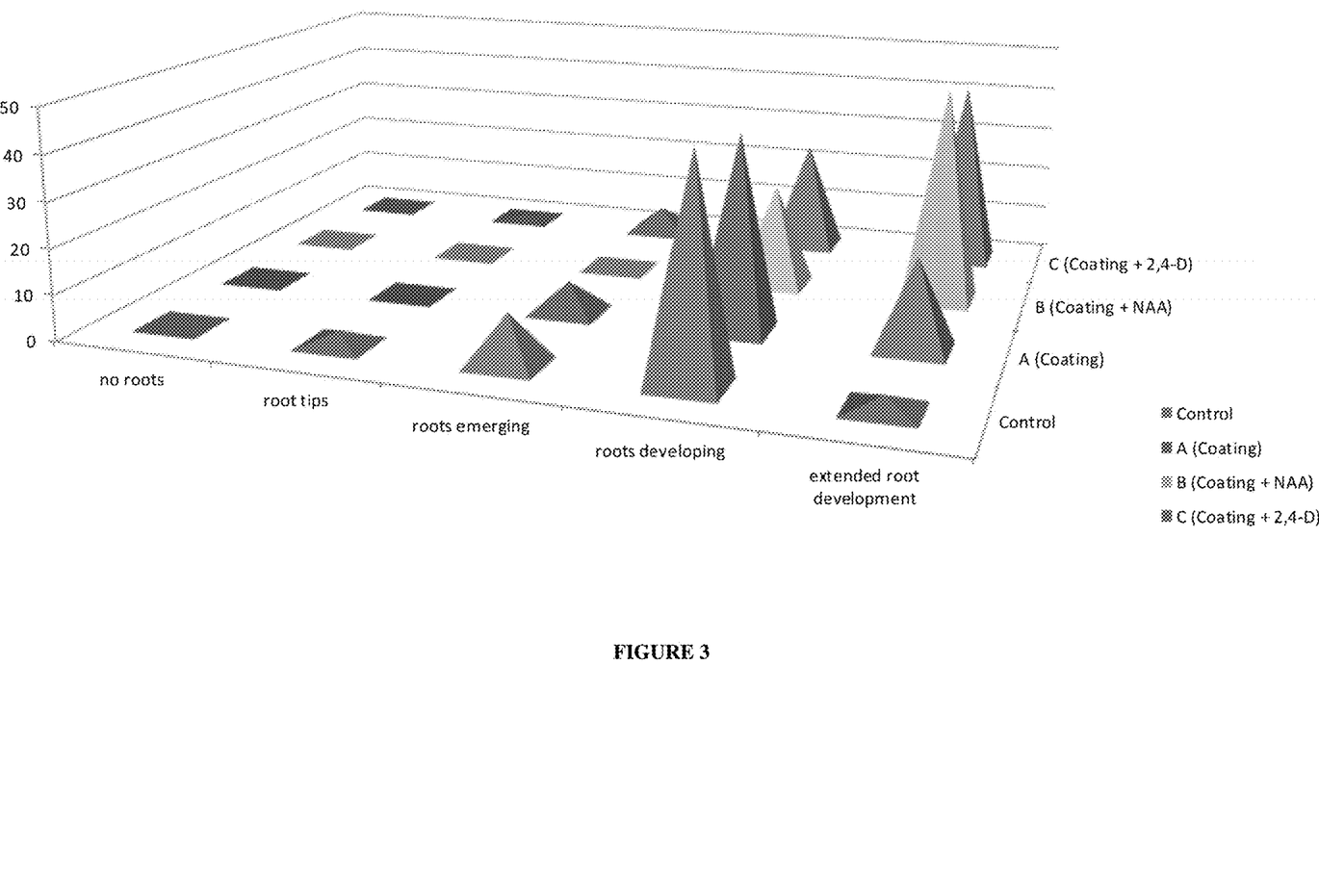
FIG. 3: shows a graphical representation of the data shown in Table 2.
Figure 4:
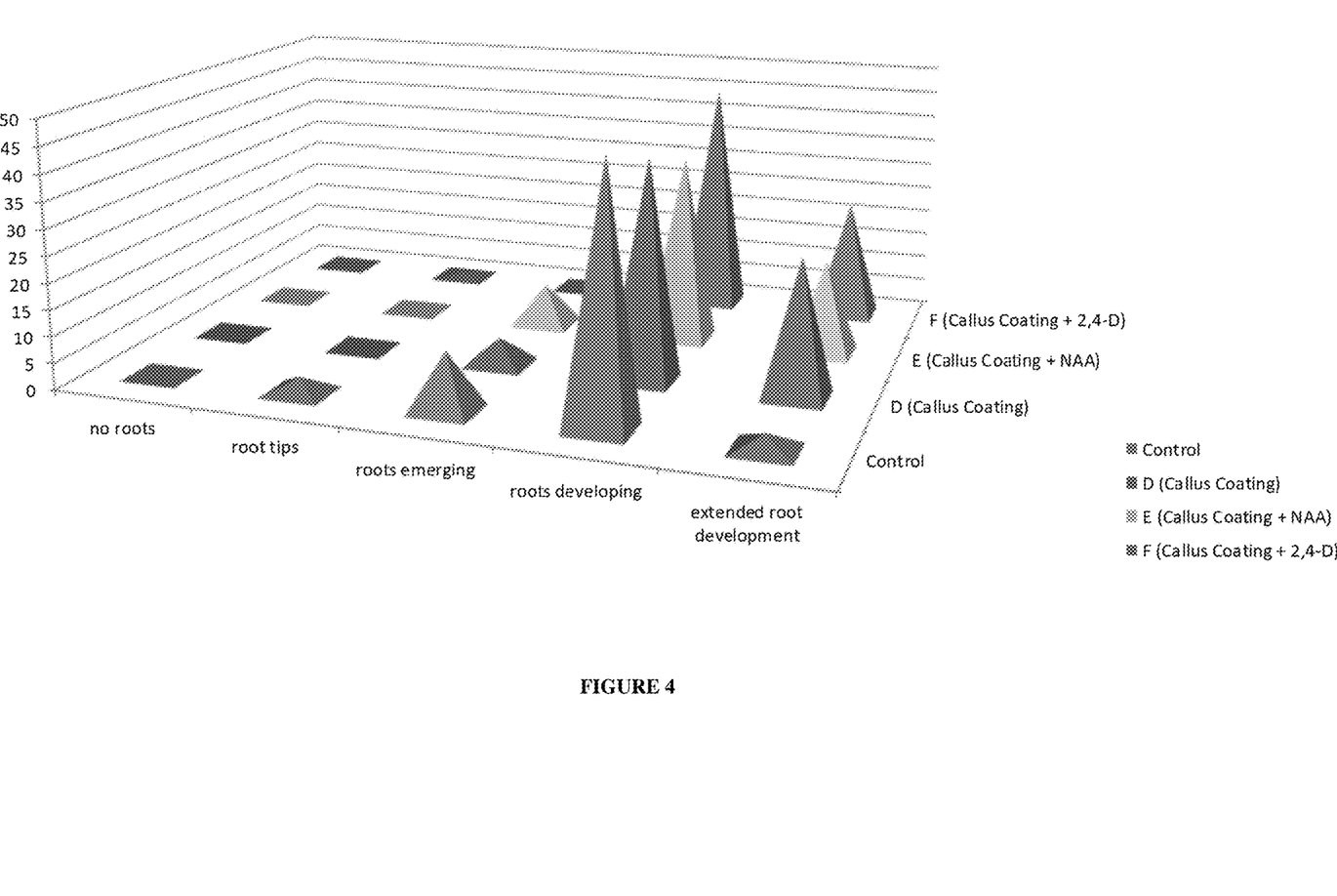
FIG. 4: shows a graphical representation of the data shown in Table 3.
Figure 5:
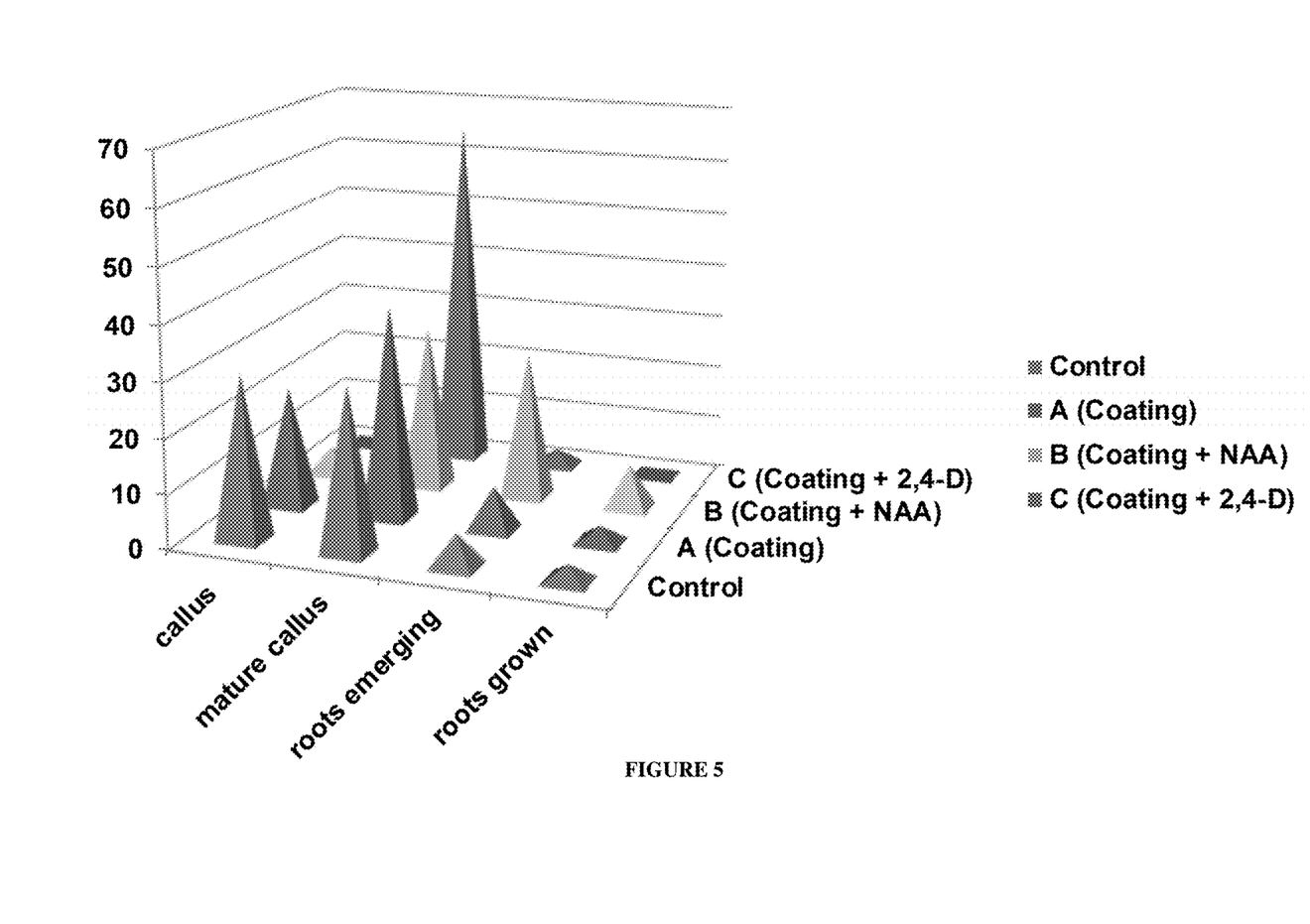
FIG. 5: shows a graphical representation of the data shown in Table 4.
Figure 6:
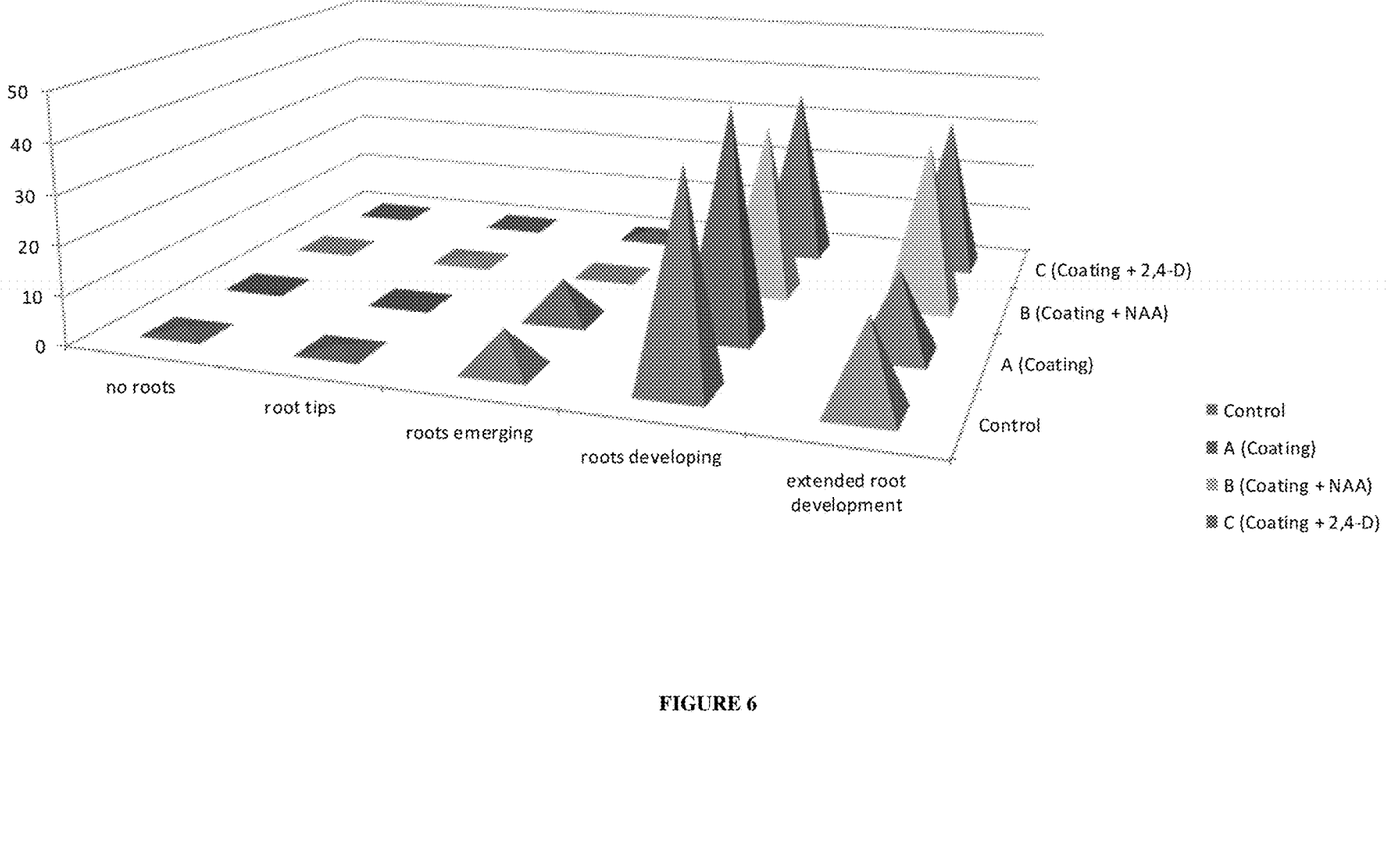
FIG. 6: shows a graphical representation of the data shown in Table 5.
Figure 7:
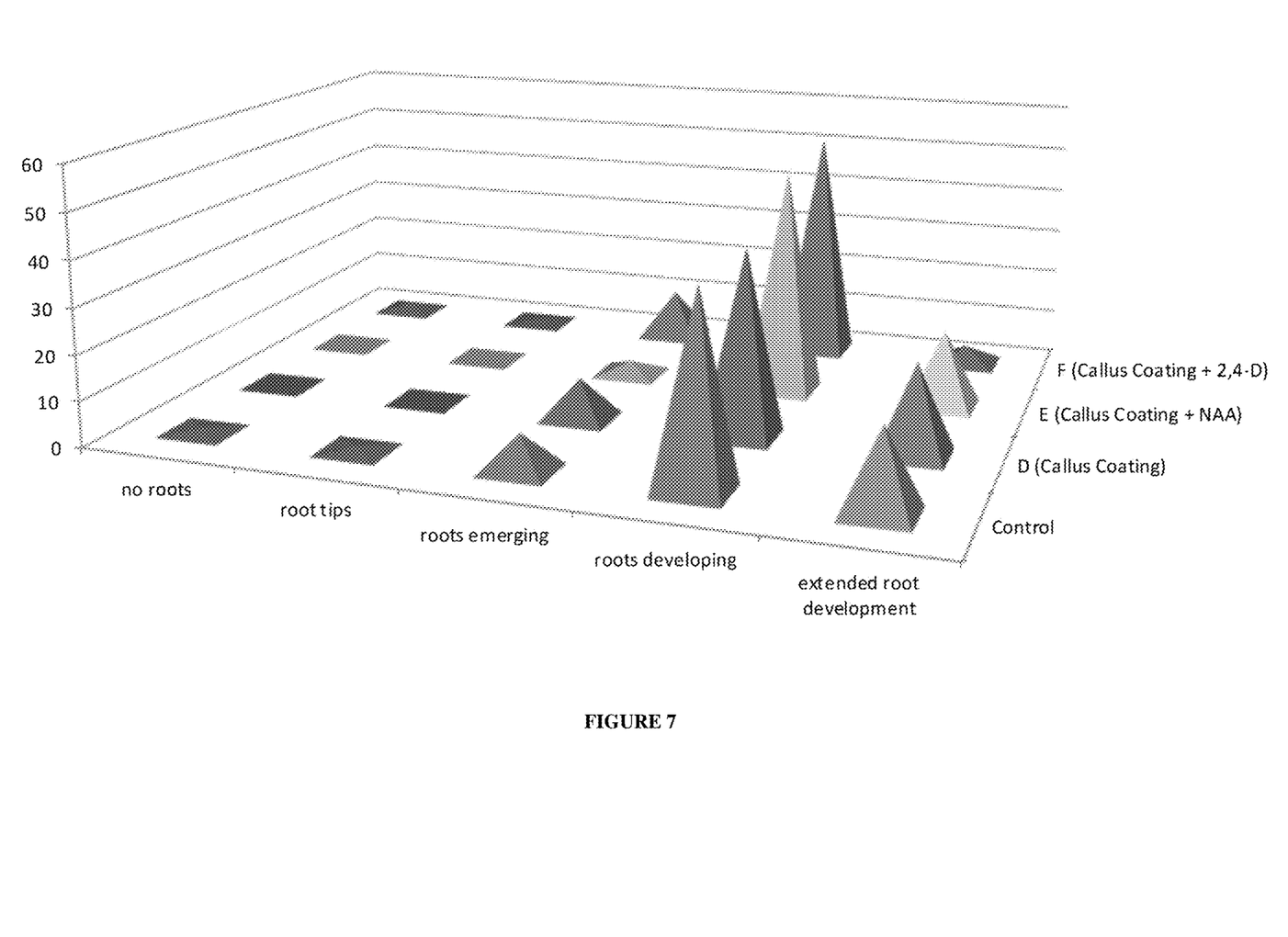
FIG. 7: shows a graphical representation of the data shown in Table 6.
Figure 8:
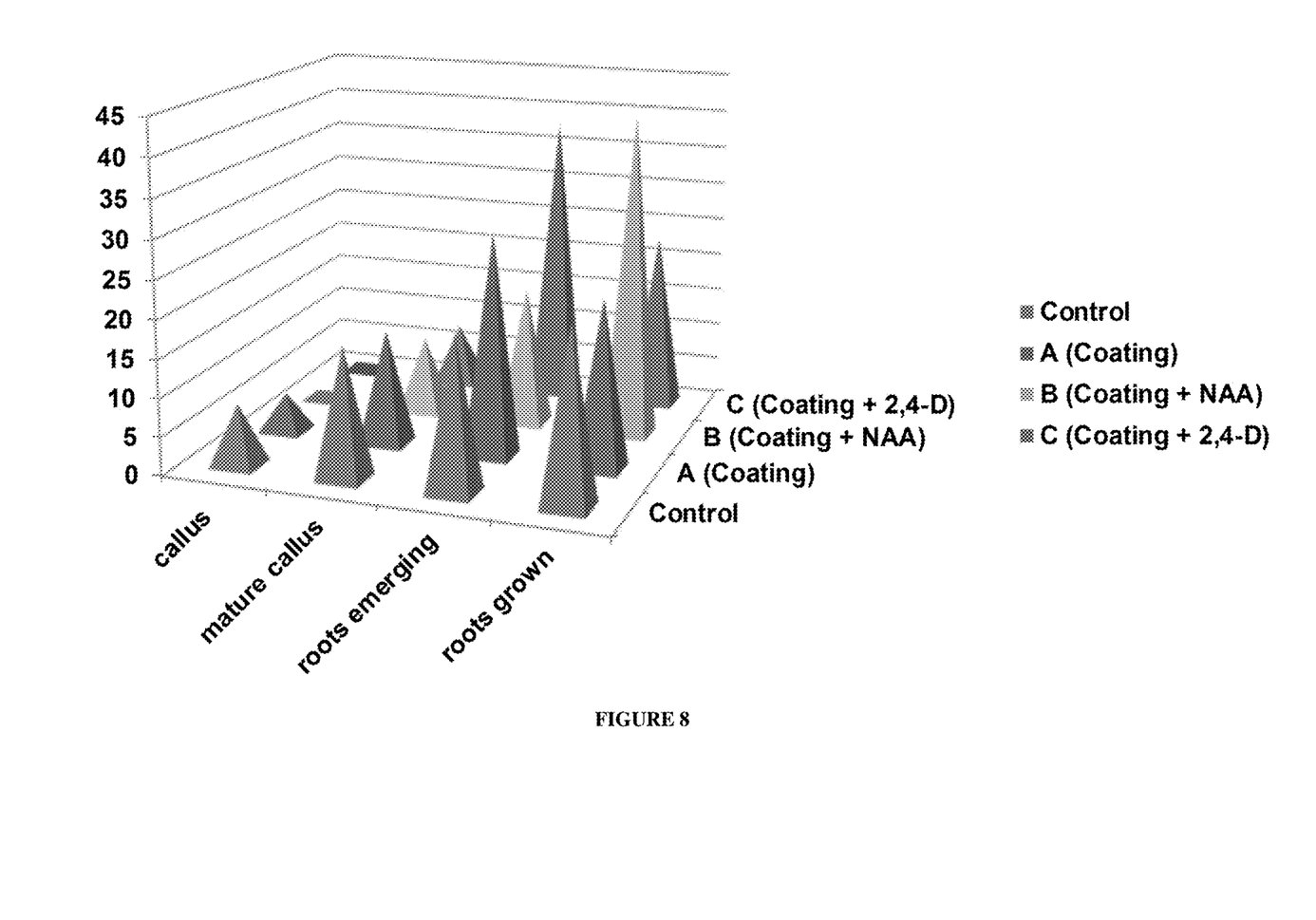
FIG. 8: shows a graphical representation of the data shown in Table 7.
Figure 9:
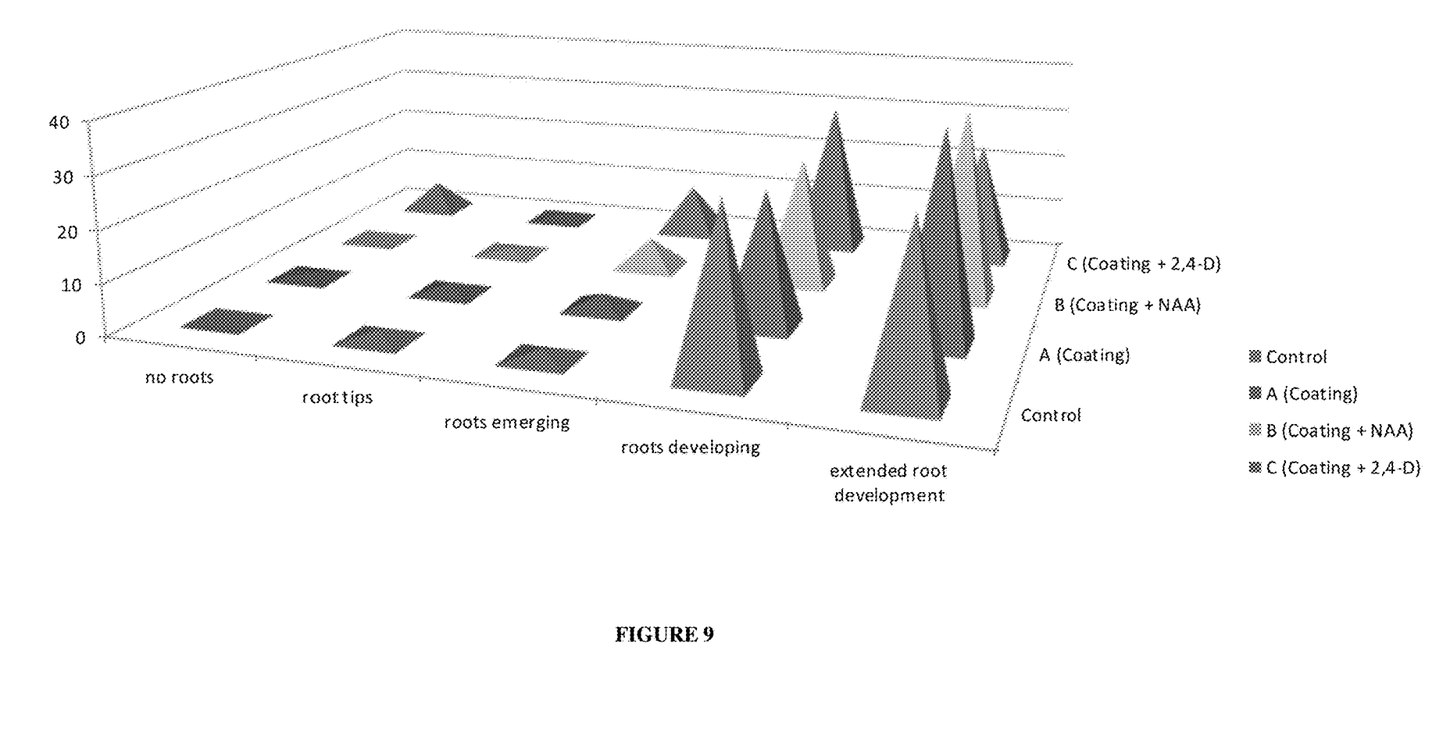
FIG. 9: shows a graphical representation of the data shown in Table 8.
Figure 10:
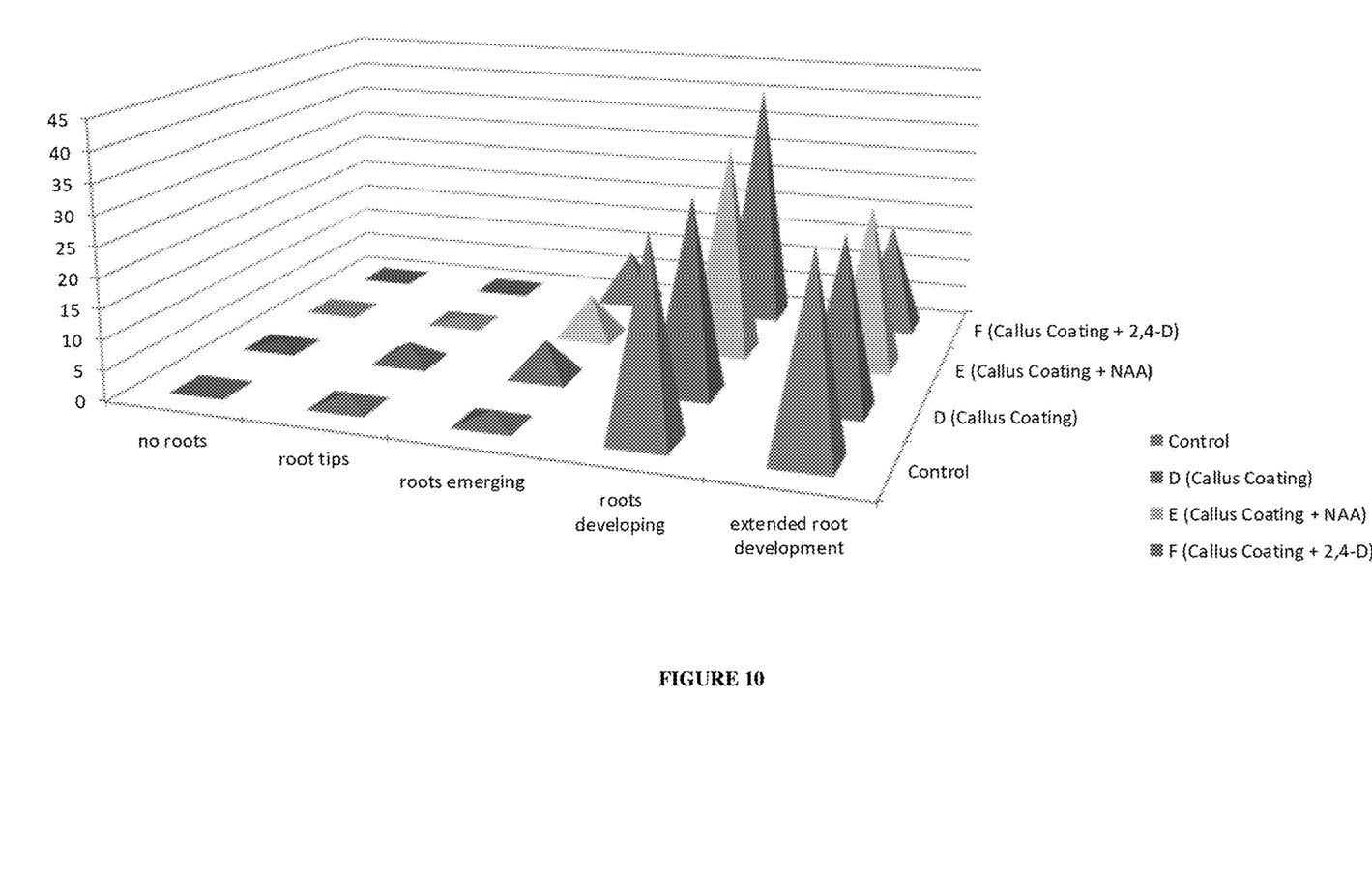
FIG. 10: shows a graphical representation of the data shown in Table 9.

Below, the results of the three trails are presented in Tables 1 to 9. The numbers depict number of cuttings belonging to a specific category. Graphical presentation of the results is shown for Table 1 in FIG. 2, for Table 2 in FIG. 3, for Table 3 in FIG. 4, etc.

TABLE 1

Part 1: callus and root initiation analysis in vermiculite - variety 20309

|  | Callus | Mature callus | Roots emerging | Roots grown |
|---|---|---|---|---|
| Control | 24 | 21 | 13 | 1 |
| A (Coating) | 24 | 35 | 4 | 7 |
| B (Coating + NAA) | 1 | 21 | 23 | 25 |
| C (Coating + 2,4-D) | 5 | 40 | 18 | 7 |

TABLE 2

Part 1: root analysis in Targa - variety 20309

| 20309 | No roots | Root tips | Roots emerging | Roots developing | Extended root development |
|---|---|---|---|---|---|
| Control | 0 | 3 | 11 | 48 | 3 |
| A (Coating) | 0 | 0 | 7 | 43 | 20 |
| B (Coating + NAA) | 0 | 0 | 0 | 23 | 48 |
| C (Coating + 2,4-D) | 0 | 1 | 6 | 25 | 42 |

TABLE 3

Part 2: 1 root analysis in Targa - variety 20309

| 20309 | No roots | Root tips | Roots emerging | Roots developing | Extended root development |
|---|---|---|---|---|---|
| Control | 0 | 3 | 11 | 48 | 3 |
| D (Callus coating) | 0 | 0 | 5 | 42 | 26 |
| E (Callus Coating + NAA) | 0 | 0 | 8 | 36 | 18 |
| F (Callus Coating + 2,4-D) | 0 | 1 | 0 | 45 | 23 |

TABLE 4

Part 1: callus and root initiation analysis in vermiculite - variety 20261

|  | Callus | Mature callus | Roots emerging | Roots grown |
|---|---|---|---|---|
| Control | 30 | 30 | 6 | 3 |
| A (Coating) | 22 | 39 | 8 | 3 |
| B (Coating + NAA) | 5 | 30 | 27 | 8 |
| C (Coating + 2,4-D) | 0 | 65 | 3 | 0 |

TABLE 5

Part 1: root analysis in Targa - variety 20261

| 20261 | No roots | Root tips | Roots emerging | Roots developing | Extended root development |
|---|---|---|---|---|---|
| Control | 1 | 1 | 8 | 42 | 18 |
| A (Coating) | 0 | 0 | 8 | 46 | 17 |
| B (Coating + NAA) | 0 | 1 | 0 | 35 | 34 |
| C (Coating + 2,4-D) | 0 | 0 | 2 | 36 | 32 |

TABLE 6

Part 2: 1 root analysis in Targa - variety 20261

| 20261 | No roots | Root tips | Roots remerging | Roots developing | Extended root development |
|---|---|---|---|---|---|
| Control | 1 | 1 | 8 | 42 | 18 |
| D (Callus coating) | 0 | 0 | 9 | 41 | 20 |
| E (Callus Coating + NAA) | 0 | 0 | 3 | 50 | 17 |
| F (Callus Coating + 2,4-D) | 2 | 1 | 11 | 52 | 4 |

TABLE 7

Part 1: callus and root initiation analysis in vermiculite - variety 20629

|  | Callus | Mature callus | Roots emerging | Roots grown |
|---|---|---|---|---|
| Control | 8 | 17 | 20 | 23 |
| A (Coating) | 5 | 15 | 29 | 22 |
| B (Coating + NAA) | 0 | 10 | 18 | 42 |
| C (Coating + 2,4-D) | 0 | 8 | 38 | 23 |

TABLE 8

Part 1: root analysis in Targa - variety 20629

| 20629 | No roots | Root tips | Roots emerging | Roots developing | Extended root development |
|---|---|---|---|---|---|
| Control | 0 | 2 | 2 | 32 | 32 |
| A (Coating) | 1 | 2 | 3 | 26 | 40 |
| B (Coating + NAA) | 0 | 1 | 6 | 25 | 37 |
| C (Coating + 2,4-D) | 6 | 1 | 10 | 30 | 24 |

TABLE 9

Part 2: 1 root analysis in Targa - variety 20629

| 20629 | No roots | Root tips | Roots emerging | Roots developing | Extended root development |
|---|---|---|---|---|---|
| Control | 0 | 2 | 2 | 32 | 32 |
| D (Callus Coating) | 1 | 3 | 6 | 32 | 28 |
| E (Callus Coating + NAA) | 0 | 1 | 7 | 35 | 27 |
| F (Callus Coating + 2,4-D) | 0 | 0 | 9 | 41 | 18 |

The invention claimed is:

1. A method for improving the vigour of plant cuttings, said method comprising the steps of:
   a) contacting a plant cutting comprising an unrooted stem having a basal cut surface with a polymeric solution or suspension comprising sodium alginate, thereby providing a coated plant cutting; and
   b) adding 0.5 to 5% w/v of a source of calcium ions to the polymeric solution or suspension, thereby allowing the exchange of sodium ions by calcium ions and the polymeric solution or suspension of the coated plant cutting to solidify for 10 minutes to 1 hour into a complexed coating, the complexed coating in direct contact with the plant cutting, and providing an encapsulated plant cutting;
   wherein said encapsulated plant cutting is coated with the complexed coating from the basal cut surface of the plant cutting to less than 60% of the total length of said unrooted stem to partially encapsulate the plant cutting with the complexed coating.

2. The method according to claim 1, wherein said method further comprises a washing or rinsing step after step (b).

3. The method according to claim 1, wherein said polymer solution or suspension comprises one or more plant growth promoting and/or plant protecting compounds, and wherein said one or more plant growth promoting and/or plant protecting compounds are selected from the group consisting of auxin and derivatives thereof, plant hormones, antibiotics, sugars, minerals, and trace elements.

4. The method according to claim 3, wherein said one or more plant growth promoting and/or plant protecting compounds growth promoting and/or plant protecting compounds comprise 1-naphthaleneacetetic acid or 2,4-dichlorophenoxyacetetic acid.

5. The method according to claim 1, wherein said complexed coating is from the basal cut surface or tip of the plant cutting to less than 50% of the total length of said plant cutting.

6. The method according to claim 1, wherein said improved vigour comprises faster root development and/or improving adventitious root formation of said plant cuttings.

7. An encapsulated plant cutting comprising from a basal cut surface of the plant cutting to less than 60% of the total length of said plant cutting a complexed coating comprising a solidified polymeric solution or suspension comprising sodium alginate, wherein said plant cutting is an unrooted portion of a plant stem, and wherein said sodium alginate solution or suspension is solidified in direct contact with the plant cutting by contacting the sodium alginate solution or suspension coated plant cutting with a solution comprising 0.5 to 5% w/v calcium ions for 10 minutes to 1 hour to allow an exchange sodium ions with the calcium ions to produce calcium alginate.

8. The encapsulated plant cutting according to claim 7, wherein the polymer solution or suspension comprises one or more plant growth promoting and/or plant protecting compounds, wherein said one or more plant growth promoting and/or plant protecting compounds are selected from the group consisting of auxin, plant hormones, antibiotics, and sugars.

9. The encapsulated plant cutting according to claim 8, wherein said one or more plant growth promoting and/or plant protecting compounds comprise 1-naphthaleneacetetic acid or 2,4-dichlorophenoxyacetetic acid.

10. The encapsulated plant cutting according to claim 7, wherein said complexed coating is from the basal cut surface or tip of the plant cutting to less than 50% of the total length of said plant cutting.

11. A plant cutting obtained by a method according to claim 1.

12. The plant cutting according to claim 11, wherein the plant is provided in a growth substrate selected from the group consisting of vermiculite, glass wool, peat, rock wool, soil, coir, and clay.

13. The method according to claim 1, wherein the source of calcium ions comprises $CaCl_2$.

* * * * *

UNITED STATES PATENT AND TRADEMARK OFFICE
CERTIFICATE OF CORRECTION

PATENT NO. : 12,193,438 B2
APPLICATION NO. : 15/577125
DATED : January 14, 2025
INVENTOR(S) : Pankaj Bacharam Dhonukshe et al.

Page 1 of 1

It is certified that error appears in the above-identified patent and that said Letters Patent is hereby corrected as shown below:

On the Title Page

Column 1, item [72], Inventors, Line 3, delete "Dummen," and insert -- Dümmen, --

Column 2, item [57], Abstract, Line 1, delete "vigor," and insert -- vigour, --

In the Claims

Column 10, Line 8, Claim 4, delete "1-naphthaleneacetetic" and insert -- 1-naphthaleneacetic --

Column 10, Lines 8-9, Claim 4, delete "2,4-dichlorophenoxyacetetic" and insert
-- 2,4-dichlorophenoxyacetic --

Column 10, Line 38, Claim 9, delete "1-naphthaleneacetetic" and insert -- 1-naphthaleneacetic --

Column 10, Line 39, Claim 9, delete "2,4-dichlorophenoxyacetetic" and insert
-- 2,4-dichlorophenoxyacetic --

Signed and Sealed this
Twenty-fifth Day of March, 2025

Coke Morgan Stewart
*Acting Director of the United States Patent and Trademark Office*